United States Patent [19]

van Leeuwen et al.

[11] Patent Number: 5,225,386

[45] Date of Patent: Jul. 6, 1993

[54] POLYMERIZATION OF CARBON MONOXIDE/OLEFIN WITH POLYALKOXYALKANE

[75] Inventors: Petrus W. N. M. van Leeuwen; Cornelis F. Roobeek, both of Amsterdam, Netherlands; Pui K. Wong, Katy, Tex.

[73] Assignee: Shell Oil Company, Houston, Tex.

[21] Appl. No.: 783,593

[22] Filed: Oct. 28, 1991

Related U.S. Application Data

[62] Division of Ser. No. 509,845, Apr. 17, 1990, Pat. No. 5,091,507.

[30] Foreign Application Priority Data

Apr. 19, 1989 [NL] Netherlands ............ 8900978

[51] Int. Cl.$^5$ .............................................. B01J 31/00
[52] U.S. Cl. .................................... 502/162; 502/170; 502/171
[58] Field of Search ............... 502/162, 170, 171

[56] References Cited

U.S. PATENT DOCUMENTS

| | | |
|---|---|---|
| 2,495,286 | 1/1950 | Brubaker ............................. 528/392 |
| 3,694,412 | 9/1972 | Nozaki ................................. 528/392 |
| 4,810,774 | 3/1989 | Drent .................................. 528/392 |
| 4,818,810 | 4/1989 | Drent .................................. 528/392 |
| 4,824,935 | 4/1989 | Van Broekhoven et al. ...... 528/392 |
| 4,835,250 | 5/1989 | Drent .................................. 528/392 |
| 4,843,144 | 6/1989 | Van Broekhoven eet al. .... 528/392 |
| 4,868,282 | 9/1989 | Van Broekhoven et al. ...... 528/392 |
| 4,880,903 | 11/1989 | Van Broekhoven et al. ...... 528/392 |
| 4,894,435 | 1/1990 | Drent .................................. 528/392 |

FOREIGN PATENT DOCUMENTS

| | | |
|---|---|---|
| 0121965 | 10/1984 | European Pat. Off. . |
| 0181014 | 5/1986 | European Pat. Off. . |
| 0213671 | 3/1987 | European Pat. Off. . |
| 0257663 | 3/1988 | European Pat. Off. . |
| 1081304 | 8/1967 | United Kingdom . |

*Primary Examiner*—Patrick P. Garvin
*Assistant Examiner*—E. D. Irzinski

[57] ABSTRACT

An improved process for the production of linear alternating polymers of carbon monoxide and at least one ethylenically unsaturated hydrocarbon of at least 3 carbon atoms employs a novel catalyst composition formed from a palladium compound, the anion of a strong non-hydrohalogenic acid, an aliphatic bidentate ligand of phosphorus and a polyalkoxyalkane.

14 Claims, No Drawings

POLYMERIZATION OF CARBON MONOXIDE/OLEFIN WITH POLYALKOXYALKANE

This is a continuation of application Ser. No. 07/509,845 filed Apr. 17, 1990, now U.S. Pat. No. 5,091,5.

FIELD OF THE INVENTION

The present invention relates to an improved process ior the production of linear alternating polymers of carbon monoxide and at least one ethylenically unsaturated hydrocarbon of at least three carbon atoms. More particularly, the invention relates to such a process for the production of the linear alternating polymers in which the activity of the palladium-containing polymerization catalyst composition is promoted by the presence of a polyalkoxyalkane.

BACKGROUND OF THE INVENTION

The class of polymers of carbon monoxide and olefin(s) is well known in the art. Brubaker, U.S. Pat. No. 2,495,286 produced such polymers of relatively low carbon monoxide content in the presence of free radical initiators, e.g., peroxy compounds. G.B. 1,081,304 produced similar polymers of higher carbon monoxide content in the presence of alkylphosphine complexes of palladium compounds as catalyst. Nozaki extended the reaction to produce linear alternating polymers in the presence of arylphosphine complexes of palladium moieties and certain inert solvents. See, for example, U.S. Pat. No. 3,694,412. More recently, the production of the linear alternating polymers has become of greater interest because of the availability and the desirable properties of such polymers, now becoming known as polyketones or polyketone polymers. The more recent processes ior the production of polyketone polymers are illustrated by a number of published European patent applications including 121,965, 181,014, 213,671 and 257,663. The processes generally involve the use of a catalyst composition formed from a compound of palladium, cobalt or nickel, the anion of a strong non-hydrohalogenic acid and a bidentate ligand of phosphorus, arsenic or antimony. The scope of the polymerization is extensive but, without wishing to be limited, many preferred catalyst compositions are produced from a compound of palladium, the anion of a non-hydrohalogenic acid having a pKa below 2 and a bidentate aromatic ligand of phosphorus.

The rate at which polymerization takes place will be determined in part by the ethylenically unsaturated hydrocarbons undergoing polymerization. In general, ethylene will polymerize at a rate considerably faster than ethylnically unsaturated hydrocarbons of three or more carbon atoms. Copolymers of ethylene and a second ethylenically unsaturated hydrocarbon of three or more carbon atoms are also formed at an acceptable rate in the presence of the above-described catalyst composition. When all the ethylenically unsaturated hydrocarbons are of three or more carbon atoms the rate of polymerization decreases.

It is known that the rate of production of linear alternating polymers containing at least a portion of ethylene can be improved or promoted by the presence of organic oxidizing agents including hydroquinones. In U.S. Pat. Nos. 4,810,774 and 4,824,935, it is disclosed that oxygen-containing generally acyclic aliphatic compounds such as ethers, ketones and esters will serve to promote catalytic activity in the polymerization or copolymerization of ethylene to form linear alternating polymers. It would be of advantage to provide a process ior the production of linear alternating polymers of carbon monoxide and ethylenically unsaturated hydrocarbon of at least 3 carbon atoms wherein the catalytic activity of a palladium-containing polyketone polymerization catalyst has been promoted.

SUMMARY OF THE INVENTION

The present invention provides an improved process for the production of linear alternating polymer of carbon monoxide and at least one olefinically unsaturated hydrocarbon of three or more carbon atoms. More particularly, the invention provides a process for the production of such linear alternating polymers wherein the activity of the palladium-containing polymerization catalyst is promoted by the presence of a polyalkoxyalkane.

DESCRIPTION OF THE INVENTION

The process of the invention comprises the production of linear alternating polymers of carbon monoxide and at least one ethylenically unsaturated hydrocarbon of at least 3 carbon atoms in the presence of a novel catalyst composition. The ethylenically unsaturated hydrocarbons which are employed as monomers in the process of the invention have from 3 to 20 carbon atoms inclusive, preferably from 3 to 10 carbon atoms inclusive, and are straight-chain, branched or cyclic olefins. The preferred olefin monomers are represented by the formula

wherein R is hydrogen or alkyl of up to 8 carbon atoms inclusive and R' is alkyl of up to 8 carbon atoms inclusive with the proviso that R and R' taken together may form an alkylene bridging group of up to 8 carbon atoms inclusive with from 3 to 4 carbon atoms in the bridge. Illustrative of such ethylenically unsaturated hydrocarbons are propylene, 1-butylene, isobutylene, 2-hexene, 1-octene, cyclopentene, cyclohexene and 4-ethylcyclohexene. The particularly preferred olefinic monomers are straight-chain α-olefins, especially propylene.

The carbon monoxide and the ethylenically unsaturated hydrocarbons react in the presence of the promoted palladium-containing catalyst composition to produce a linear alternating polymer. Such polymers are represented by the repeating formula

wherein G represents a moiety of the ethylenically unsaturated hydrocarbon of at least 3 carbon atoms polymerized through the ethylenic unsaturation. It should be appreciated that because of the unsymmetrical nature of many of the olefinic monomers, the repeating units may be present in two isomeric forms, depending upon the geometry of the polymerization process. Employing the polymerization of propylene for example, the linear alternating polymer will contain units of

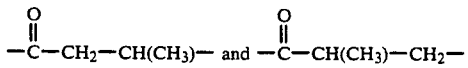

occurring randomly throughout the polymer chain. The term G in the above formula 11 may be a single ethylenically unsaturated hydrocarbon as in the case of copolymers of carbon monoxide and the hydrocarbon or G may represent more than one ethylenically unsaturated hydrocarbon of three or more carbon atoms in the case of terpolymers or other polymers. The preferred linear alternating polymers are copolymers of carbon monoxide and a single ethylenically unsaturated hydrocarbon and particularly preferred are copolymers of carbon monoxide and propylene.

The carbon monoxide and olefinic monomers are contacted in the presence of a promoted catalytic system formed from a compound of palladium, the anion of a strong non-hydrohalogenic acid, a bidentate aliphatic ligand of phosphorus and a polyalkoxyalkane. A variety of palladium compounds are useful as precursors of the catalyst composition but preferred palladium compounds are alkanoates such as palladium acetate, palladium propionate, palladium buiyrate, palladium hexanoate and palladium octanoate. Palladium acetate is particularly preferred. The anion to be provided to the catalyst composition is the anion of a non-hydrohalogenic acid having a pKa (measured in water at 18° C.) below about 6 and preferably below 2. Suitable anions include the anions of inorganic acids such as sulfuric acid and perchloric acid and organic acids including carboxylic acids such as trichloroacetic acid, trifluoroacetic acid and dichloroacetic acid as well as sulfonic acids such as methanesulionic acid, p-toluenesulfonic acid and trichloromethanesulfonic acid. The anions of trifluoroacetic acid and p-toluenesulfonic acid are a preferred class of anions to be utilized as Precursor of the catalyst composition. The anion is provided in a quantity of from about 0.5 mole to about 50 moles per mole of the palladium but preferably in a quantity of from about 1 mole to about 25 moles per mole of palladium. The anion is preferably provided as the free acid but it is also useful to provide the anion as a metal salt, particularly as a non-noble transition metal salt such as the nickel salt or the copper salt. In yet another embodiment, the palladium and the anion are provided as a single compound, for example, palladium p-toluenesulfonate.

The bidentate phosphorus ligands are aliphatic bidentate ligands of phosphorus and the preferred ligands are represented by the formula $$(R')_2P-R''-P(R')_2 \quad \text{(III)}$$

wherein R' independently has the previously stated meaning and R" is a bridging group preferably hydrocarbon, of up to 8 carbon atoms inclusive with from 2 to 4 carbon atoms in the bridge. Illustrative R" groups are 1,2-ethylene, 1,3-propylene, 2,2-dimethyl-1,3-propylene and 1,4-butylene. The preferred ligands of the above formula III are bis(dialkylphosphino)propanes, particularly 1,3-bis(dialkylphosphino)propane. Especially preferred as the aliphatic bidentate ligand is 1,3-bis(di-n-butylphosphino)propane. The bidentate phosphorus ligand is provided to the catalyst composition in a quantity from about 0.5 mole to about 2 mols per mole of the palladium but quantities from about 0.75 mole to about 1.5 mol per mole of palladium are more frequently utilized.

The catalyst composition solutions of the invention will also include, as a promoter, a polyalkoxyalkane wherein from two to three alkoxy groups are present as substituents of the same aliphatic carbon atom. The polyalkoxyalkanes are suitably represented by the formula $$RCXR'''OR')_2 \quad \text{(IV)}$$

wherein R is hydrogen or alkyl of up to 8 carbon atoms inclusive R' has the previously stated meaning and R''' is R or OR'. The polyalkoxyalkanes therefore include dialkyl acetals such as 1,1-dimethoxycthane and 1,1-diethoxybutane, dialkyl ketals such as 2,2-dimethoxypropane and 3,3-dipropoxyhexane and alkyl ortho esters such as 1,1,1-trimethoxyethane and trimethoxymethane. The preferred polyalkoxyalkanes of the above formula IV are ortho esters, i.e., the compounds of the formula wherein R''' is OR', and particularly preferred is trimethoxymethane. The polyalkoxyalkane is provided to the catalyst composition solution in a quantity of from about 100 moles to about 5000 moles per moles of palladium. Preferred quantities of the polyalkoxyalkane are from about 500 moles to about 3000 moles per mole of palladium.

The monomeric reactions and the catalyst composition are contacted in the presence of an inert reaction diluent under polymerization conditions. Sufficient catalyst composition is employed to provide from about $1 \times 10^{-7}$ mole to about $1 \times 10^{-3}$ mole of palladium per mol of ethylenically unsaturated hydrocarbon of at least 3 carbon atoms to be polymerized. Preferred quantities of catalyst composition provide from about $1 \times 10^{-6}$ mole to about $1 \times 10^{-4}$ per mole of hydrocarbon. The molar ratio of the ethylenically unsaturated hydrocarbon to carbon monoxide will usefully be from about 10:1 to about 1:10 but more often the molar ratio will be from about 5:1 to about 1:5. The reaction diluent is customarily an alkanol such as methanol or ethanol and methanol is preferred. Additional reaction diluents ma be utilized to improve the mutual solubility of the reaction mixture components provided that the diluents are inert toward the reactants and catalyst composition. Illustrative of such additional diluents are alkanones such as acetone and methyl ethyl ketone and ethers such as tetrahydrofuran, dioxane and diethylene glycol dimethyl ether.

The contacting of the reaction mixture components is conducted in a suitable reactor and contact is facilitated by agitation such as shaking or stirring. Typical polymerization conditions include a reaction temperature from about 20° C. to about 100° C., preferably from about 30° C to about 85° C. The reaction pressure will be from about 5 bar to about 150 bar with reaction pressures from about 20 bar to about 100 bar being particularly useful. Subsequent to polymerization the reaction is terminated as by cooling the reactor and contents and releasing the pressure. The polymer product is generally obtained as a material substantially insoluble in the product mixture and is recovered by conventional procedures such as filtration or decantation. In some instances where reaction diluents have been employed in addition to alkanol the polymer product may be somewhat soluble in the product mixture. In such instances the polymer is typically precipitated by

the addition of methanol and then recovered. The polymer product is used as recovered or is purified as by contact with a solvent or extraction agent which is selective for catalyst residues.

The linear alternating polymer is a relatively high molecular weight thermoplastic and finds utility in applications where thermoplastics are customarily utilized. The polymers are processed by procedures conventional ior thermoplastics, e.g., injection molding, extrusion and thermoforming, into wires, cables, sheets, films and other shaped articles of established utility. By way of further example, the polymers are used to produce containers for food and drink and parts and housings for automotive applications.

The invention is further illustrated by the following Comparative Examples (not of the invention) and the following Illustrative Embodiments which should not be regarded as limiting. In each of the Examples and Embodiments the copolymer product was examined by $^{13}$C-NMR spectroscopy. The spectra of each product were consistent with a linear polymer of alternating carbon monoxide and propylene, cyclopentene or ethylene moieties.

COMPARATIVE EXAMPLE 1

To an autoclave of 300 ml capacity equipped with a stirrer was charged 110 ml of tetrahydrofuran and 87 ml of propylene. The contents of the autoclave were warmed to 42° C. and the autoclave was pressurized with carbon monoxide until a total pressure of 40 bar was reached. The autoclave was then charged with a catalyst composition solution comprising 8.5 ml methanol, 21.5 ml tetrahydrofuran, 0.052 mmol palladium acetate, 0.264 mmol nickel perchlorate and 0.063 mmol 1,3-bis(di-n-butylphosphino)propane. Polymerization was terminated after 140 hours by cooling the autoclave and contents to room temperature and releasing the pressure. The reaction mixture was poured, with stirring, into methanol and the copolymer product was recovered by filtration, washed with methanol and dried.

The yield of copolymer was 11.5 g, produced at a rate of 15 g of copolymer/g palladium hr.

ILLUSTRATIVE EMBODIMENT I

A copolymer of carbon monoxide and propylene was produced by a procedure substantially similar to that of Comparative Example I except that
a) the autoclave additionally was initially charged with 2 ml of trimethoxymethane and 10 g of p-toluenesulfonic acid,
b) the catalyst composition solution comprised 8.5 ml methanol, 21.5 g tetrahydrofuran, 0.043 mmol palladium acetate, 0.212 mmol nickel perchlorate and 0.05Z mmol 1,3-bis(di-n-butylphosphino)propane, and
c) the reaction time was 15.35 hours instead of 140 hours.

The yield of copolymer was 9.54 g produced at a rate of 140 g of copolymer/g palladium hr.

ILLUSTRATIVE EMBODIMENT II

A copolymer of carbon monoxide and propylene was produced by a procedure substantially similar to that of Comparative Example 1 except that
a) the initial charge to the autoclave comprised 120 ml of methanol instead of tetrahydrofuran and 80 ml of propylene instead of 87 ml, and additionally contained 2 ml of trimethoxymethane and 3 mg of p-toluenesulfonic acid,
b) the catalyst composition solution contained 8.5 ml methanol, 21.5 ml tetrahydrofuran, 0.051 mmol palladium acetate, 0.1 mmol p-toluenesulfonic acid and 0.06 mmol 1,3-bis(di-n-butylphosphino)propane, and
c) the reaction time was 17.53 hours instead of 140 hours.

The yield of copolymer was 31.11 g, produced at a rate of 330 g of copolymer/g palladium hr.

ILLUSTRATIVE EXAMPLE III

A carbon monoxide/propylene copolymer was produced by a process substantially similar to that of Comparative Example I except that
a) the autoclave initially contained 120 ml of propylene instead of tetrahydrofuran and 87 ml instead of 80 ml of propylene, and additionally contained 2 ml of trimethoxymethane and 10 mg of p-toluenesulfonic acid,
b) the catalyst composition solution comprised 8.5 ml methanol, 21.5 ml tetrahydrofuran, 0.043 mmol palladium acetate, 0.212 mmol nickel perchlorate and 0.052 mmol 1,3-bis(di-n-butylphosphino)propane, and
c) the reaction time was 29.2 hours instead of 140 hours.

The yield of copolymer was 63 g, obtained at a rate of 470 g of copolymer/g palladium hr.

ILLUSTRATIVE EXAMPLE IV

A copolymer of carbon monoxide and cyclopentene was produced by a procedure substantially similar to that of Comparative Example 1 except that
a) the initial charge to the autoclave contained 120 ml of methanol instead of tetrahydrofuran and 85 ml of cyclopentene instead of propylene and additionally contained 3.5 ml of trimethoxymethane and 0.093 mmol of p-toluenesulfonic acid,
b) the reaction temperature was 40° C. instead of 42° C.,
c) carbon monoxide was added until a total pressure of 60 bar was reached instead of 40 bar,
d) the catalyst composition solution comprised 8.5 ml methanol, 21.5 ml tetrahydrofuran, 0.043 mmol Palladium acetate and 0.052 mmol 1,3-bis(di-n-butylphosphino)propane, and
e) the reaction time was 66 hours instead of 140 hrs.

The yield of copolymer was 2.8 g, produced at a rate of 5.1 g of copolymer/g palladium hr.

COMPARATIVE EXAMPLE II

A copolymer of carbon monoxide and ethylene was produced by charging to an autoclave of 250 ml capacity equipped with a stirrer a catalyst composition solution comprising 100 ml methanol, 0.1 mmol palladium acetate, 0.2 mmol p-toluenesulfonic acid and 0.1 mmol 1,3-bis(diphenylphosphino)propane. An equimolar mixture of carbon monoxide and ethylene was introduced into the autoclave and the autoclave and contents were warmed to 90° C. After 1 hour, the polymerization was terminated by cooling the autoclave and contents to room temperature and releasing the pressure. The copolymer product was recovered by Filtration, washed with methanol and dried.

The yield of copolymer was 17.8 g, produced at a rate of 1.8 kg of copolymer/g palladium hr.

COMPARATIVE EXAMPLE III

A copolymer of carbon monoxide and ethylene was produced by a procedure substantial)y similar to that of Comparative Example II, except that the catalyst composition solution additionally contained 2 ml of trimethoxymethane.

The yield of copolymer was 13.5 g, produced at a rate of 1.3 kg of copolymer/g palladium hr.

What is claimed is:

1. A catalyst composition comprising a solution of palladium carboxtylate, the anion of a non-hydrohalogenic acid having a pKa below 2, an aliphatic bidentate phosphorus ligand and a polyalkoxyalkane with from two to three alkoxy groups present as substituents of the same aliphatic carbon atoms.

2. The composition of claim 1 wherein the palladium carboxylate is palladium acetate.

3. The composition of claim 2 wherein the bidentate ligand is represented by the formula

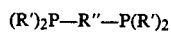

(R')$_2$P—R"—P(R')$_2$ wherein R' independently is alkyl of up to 8 carbon atoms inclusive and R" is a bridging group of up to 8 carbon atoms inclusive with from 2 to 4 carbon atoms in the bridge.

4. The composition of claim 3 wherein the polyoxyalkane is represented by the formula

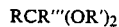

RCR'"(OR')$_2$ wherein R is hydrogen or alkyl of up to 8 carbon atoms inclusive and R'" is R or OR', wherein R' independently is alkyl of up to 8 carbon atoms inclusive.

5. The composition of claim 4 wherein the bidentate ligand is 1,3-bis(dialkylphosphino propane.

6. The composition of claim 5 wherein R'" is OR'.

7. The composition of claim 6 wherein the bidentate ligand is 1,3-bis(di-n-butylphosphino)propane.

8. The composition of claim 7 wherein the polyalkoxyalkane is trimethoxymethane.

9. The composition of claim 1 wherein the polyalkoxyalkane is selected from the group consisting of dialkyl acetals, dialkyl ketals, and alkyl ortho esters.

10. A catalyst composition comprising a solution of palladium acetate, the anion of a non-hydrohalogenic acid having a pKa below 2, an aliphatic bidentate phosphorus ligand selected from the group consisting of 1,3-bis(dialkylphosphine)propane and 1,3-bis(di-n-butylphosphino)propane, and a polyalkoxyalkane selected from the group consisting of dialkyl acetals, dialkyl ketals, and alkyl ortho esters.

11. The composition of claim 10 wherein the anion of a nonhydrohalogenic acid having a pKa below 2 is an anion of trifluoroacetic acid or p-toluenesulfonic acid.

12. The composition of claim 11 wherein the polyalkoxyalkane is trimethoxymethane.

13. A catalyst composition comprising a solution of palladium acetate, the anion of a non-hydrohalogenic acid having a pKa below 2, an aliphatic bidentate phosphorus ligand selected from the group consisting of 1,3-bis(dialkylphosphino)propane and 1,3-bis(di-n-butylphosphino)propane, and trimethoxymethane.

14. The composition of claim 10 wherein the anion of a non-hydrohalogenic acid having a pKa below 2 is an anion of trifluoroacetic acid or p-toluenesulfonic acid.

* * * * *